United States Patent Office 3,246,989
Patented Apr. 19, 1966

3,246,989
METHOD FOR THE PRODUCTION OF AN
IMPROVED ANIMAL FEED
Heinrich Biehl, Heinrichshof, near Trittau, Germany
No Drawing. Filed Sept. 30, 1964, Ser. No. 400,549
3 Claims. (Cl. 99—2)

The present application is a continuation-in-part of my United States application Serial No. 296,091, filed July 18, 1963, now abandoned.

The present invention relates to the production of improved feed substances by fermentation, without the addition of green fodder. More particularly, the present invention relates to a novel feed mixture produced by fermentation, and consisting of a mixture of cereals, protein containing dry animal-foods and water.

Green fodder which is usually used for fermentation, is unwieldy in handling and transporting and the like, and it is an object of the invention to provide a process for producing a fermentative formula which contains all of the substances necessary for animal nutriment, without using any green, fresh fodder.

It is a further object of the invention to provide a process for producing easily digestible grain type feed by fermentation of grain.

Another object of the invention is to provide a process for the production of an improved feed which comprises mixing cereal grain, a highly digestible feed ingredient having a digestible protein content of at least 20% by weight, and supplements, making a pulp by adding water to the mixture, putting said pulp into a silo and therein ensilaging it.

A further object of the invention is to provide a process which comprises preparing a fluid mixture of cereal grain, a highly digestible feed ingredient having a predetermined protein content supplements and water, putting the mixture into a silo, and ensilaging it during a period of at least 4 and preferably 6 weeks.

Yet another object of the invention is to provide a process for the production of an improved feed containing no green fodder, which process comprises making a dry comminuted mixture of cereal grain, a highly digestible protein containing feed ingredient and supplements, converting said mixture into a pulpy mass by admixing 54.5 to 240% of water by weight for each 100% by weight of the mixture having a usual water content of about 15% by weight, putting the pulpy mass into a silo and ensilaging it. Then the pulpy mass has a water content of 45 to 75% and preferably of about 55% by weight. As examples of cereal grains, preferably, rye, wheat, corn, oats and barley are used. However, the invention is not restricted to such cereal grains and other grains, such as rice and millet, may also be used.

Preferably the mixture to be ensilaged should contain a small amount of supplemented additives such as minerals, trace elements, vitamins and antibiotic substances.

When working with conventional fermentation process, usually 50% fresh fodder must be available in the starting material. This may not cause serious difficulties under normal weather and crop conditions; however, feeding of pure grain mixtures is often preferred because the grain mixture compositions are usually more available and consistent in food value and require considerably less space than fresh forage, for instance, root crops.

However, grain type feed has the disadvantage that it is more difficult to digest than is silaged fodder.

It is furthermore within the scope of the invention that the supplements take the form of antibiotic, such as Aureomycin, trace elements or vitamins, such as $B_{12}$.

In the feeding of animals, a basic feed such as turnips, potatoes, turnip leaves, grass, or grains of different types are usually used in conjunction with a protein carrier in suitable proportions as a supplement which serves also as a carrier for effective substances. It is of utmost importance to relate the overall amount of feed properly to the protein in correspondence with the required performance.

In the current feeding of domestic animals, especially hogs, it is common in many cases to exclusively use mixed grain type feeds which are free of leaves, turnips or grasses. In almost all of the countries in which farm work is being refined, the processing of mixed grain type feed plays an even more important role than does the feeding of root crops. Even if, in the feeding of pigs, the use of root crops is retained, it is frequently the custom to feed piglets which are taken from the sow when they have reached a live weight of 10 kilograms, on mixed grain type feeds—frequently called "starter" feed or sucking pig grist—until they reach a weight of 25 kilograms. Such "starter" feeds contain a high proportion of readily digestible ground grain and, in addition, contain a mixed protein carrier and especially large amounts of effective substances such as, for instance, antibiotics, vitamins, or trace elements. The special quality of the feed is intended to insure future feeding results by strengthening the condition of the animal in its early life.

In the second stage, when the hogs have reached a weight of between 25 and 40 kilograms, they are still usually receiving a mixed feed consisting exclusively of grain, a protein containing mixed feed and other effective substances even if it is intended to use as many root crops as possible. The amounts of the effective substances have been reduced in this case because of the reduced requirements.

In the next growth stage, which extends from 40 kilograms to a weight at which the hogs are ready for slaughtering (in Germany about 100 kilograms living weight), if it is intended to continue feeding on root crops, the hogs are fed on turnips, turnip leaves, potatoes and occasionally even grass mixed with a feeding having a high nourishing value (again a mixed grain feed) containing a mixed protein feed in an amount which is adapted to compensate for the lower protein content of the root crops.

While formerly this mixture of root crops and grain was mostly fed in a fresh condition with the nutrient value of the root crops being silaged at its highest and the grain portion being added later, in accordance with more recently developed practices, an immediate silaging of the turnips together with the dry grain mixture is produced wherein the dry mixture is correspondingly modified with a view to not only serving the purpose of most favorably supplying the animals with nourishing substances but also to obtain the additional object of producing a most favorable fermenting.

When feeding hogs on grain the above mentioned first and second stages, i.e. 10 to 25 kilograms of weight and 25 to 40 kilograms of weight, remain unchanged in comparison with the feeding on root crops. While, however, with the last mentioned feeding method, there is only one uniform mixture which is fed in the stage between 40 and 100 kilograms, another subdivision is still made in the grain feeding method. It is usual to take into consideration a stage of between 40 and 75 kilograms of weight and another one of between 75 to 110 kilograms of weight. The various feeding stages have one thing in common, i.e. that grain of different types, and occasionally also cereal milling by-products of different kinds, are used as a principal feed. For the establishment of the proper proportion between the overall nourishing substance and the protein, said grain mixtures have added thereto a mixed protein supplement in varying amounts and effective substances, likewise in varying amounts. The ratio between the overall nourishing substance and the protein varies with the amount of the protein supplement added. This ratio is enlarged from one section to another. This enlargement of the ratio between the overall nourishing substance and the protein is necessary because the hogs, with increasing weight, put on fat rather than flesh, but the fat is formed from the carbohydrates contained in the nourishing substances and the flesh from the protein contained in the nourishing substance.

If fermented forage which may be withdrawn from a silo is fed, this offers the advantage that feeding mixtures are provided that may be properly adjusted for each feeding stage and always remain constant. Especially good results have always been obtained with fermented feed, because uniform feeding is very advantageous in both breeding and feeding. In addition, the fermented feed is especially well digestible so that the total nutrient value of the mixture may be effectively used by the animal.

In connection with the process in accordance with the invention, there occurs another advantage in that by the mixing with water which is necessary for ensilaging, a pulpy mass is obtained while the mixed grain feed is mostly available as a relatively dry feed. A pulpy mass is much more easy to handle and meter in feeding operations with the type of equipment used for this purpose than is the usual dry mass.

Now, in the process in accordance with the invention, the principal question that had to be examined was whether when carrying out the process in accordance with the invention the advantages obtainable would be outweighed by fermenting losses occurring during the fermentation of the mixed grain feed. It has, however, been evidenced by fermentation tests that fermenting losses did on an average not amount to more than 5% as will be seen from the Table 1 below. These low fermenting losses are by far outweighed by the better utilization of the feed and the saving in feed which is connected therewith and which results from the processing of the grain connected with the fermentation.

The summary in Table 2 below shows that with the process of the invention, about a 10% saving in feed may be obtained.

TABLE 1

*Composition of the feed mixtures of the two groups and the silaging losses*

|  | Group 1 | Group 2 |
|---|---|---|
| Percent by weight: |  |  |
| Corn, dry and ground | 40.5 | 40.0 |
| Barley, dry and ground | 24.6 | 23.0 |
| Ground extracted soy beans | 13.0 | 11.5 |
| Protein concentrate mixture | 8.4 | 7.6 |
| Fat | 6.0 | 5.6 |
| Wheat bran | 5.0 | 3.8 |
| Dried yeast | 0.5 | --- |
| Sugar | 2.0 | 2.0 |
| Manioca groats | --- | 6.5 |
| Ratio of the total nutrient to the protein ingredients of the dry mass (according to analysis): |  |  |
| Before the silage | 5.61:1 | 6.12:1 |
| After the silage | 5.47:1 | 5.71:1 |
| Total quantity of dry mass charged into the silo, kg | 532.55 | 527.80 |
| Total quantity of ensilaged dry mass drawn from the silo, kg | 510.50 | 488.60 |
| Dry mass loss in weight and percent by weight resulting from silage | 22.05 kg.=4.14% | 39.20 kg.=7.43% |
| Average dry mass loss in percent by weight | 5.78 | |

TABLE 2

*Utilization of the non-silaged and the silaged feed by the animal*

| Group No. | Kind of feed | Number of animals | Initial weight in kilograms | Final weight in kilograms | Total gain in weight per animal in kilograms | Daily gain in weight per animal in grams | Total feed consumption in kilograms dry mass per animal | Kilograms dry mass fed to obtain 1 kilogram of living weight gain | Weight gain per total feed fed, percent |
|---|---|---|---|---|---|---|---|---|---|
| 1 | Not silaged | 10 | 74.000 | 84.625 | 10.625 | 759 | 29.273 | 2.76 | 36.3 |
|  | Silaged | 10 | 73.000 | 84.250 | 11.250 | 804 | 28.782 | 2.56 | 39.1 |
| 2 | Not silaged | 10 | 70.000 | 80.000 | 10.000 | 732 | 28.069 | 2.74 | 36.5 |
|  | Silaged | 10 | 71.250 | 83.125 | 11.875 | 848 | 28.454 | 2.40 | 41.7 |

Two groups numbered 1 and 2 have been tested. The composition of the feed mixtures for these groups have been given in Table 1. These compositions are substantially in conformity with the formula given below for finishing hogs from 75 to 110 kg. live weight. The protein concentrate mentioned in Table 1 corresponds to the supplement Supplementan 63 the composition of which is likewise given below.

100 parts by weight of water were mixed with 100 parts by weight of the relatively dry feed mixture having a water content of about 15% to form a pulpy mass having a water content of 57.5%. This pulp was then subjected to a silaging process.

For the control groups, the same relatively dry feed mixtures have been fed together with suitable quantities of water in the usual way. The animals of the groups have been accustomed to the feed during a period of 7 days. Thereafter the main test took place for a period of 14 days.

The test result shows that an advantage is obtained which is equivalent to a feed saving of about 10%. The net result of this is that, with the process of the invention, the same nutrient value may be obtained by additional use of components having a reduced value such as for instance cereal milling by-products, which was not possible previously.

It has furthermore been observed that hogs which have been fed on silaged feed have a better flesh to fat ratio. The fact that after slaughtering more flesh was found than with comparable animals which had been fed on unsilaged forage, confirms the statement that the protein is better utilized by the animal after fermenting.

Another advantage of the process in accordance with the invention resides in the fact that the person rearing livestock is now able to mix a supply of feed for a long period of time. The mixing is effected in such a manner that the required amount of water is added to the mixed grain feed. As a mixed grain feed develops a water content of about 15%, an amount of about 54.5 to 240 kilograms of water will have to be added to 100 kilograms of mixed grain feed for obtaining a pulpy mass or slurry the water content of which is about 45 to 75% by weight. With a water content of 10% by weight of the mixed grain feed, 63.5 to 260 kg. water will have to be added to 100 kg. of mixed grain feed. The water is intimately mixed with the mixed grain feed and charged into the silo by means of a pump. Here, the fermentation starts. After a period of about 4 to 6 weeks withdrawing may begin. The fermented feed forms a rather thick pulpy layer.

This mass may be taken without any further treatment from the lower part of the silo and may then be directly distributed amongst the hogs, for instance, by means of a feeding cart.

The processing of the mixed grain may be produced by means of a mobile mixing plant which consists of a water container for the metered addition of the water, a container for withdrawing the ready mixture, and a pump below said container serving to deliver the mixture into the silo.

The metered addition of the grist mixture may be carried out by hand if metered quantities, such as for instance, 50 kilogram sacks are available. It may, however, be produced via a tilting balance which may be charged from a silo.

Another possibility of preparing the mixed grain feed may be in the process wherein a readily mixed feed is soaked with the corresponding amount of water in the factory for producing the mixed feed, stirred in a mobile drum which rotates during transport and is discharged again into the silo of the location of use by means of a pump. For this type of processing, transport and mobile mixing plants as developed for the production of ready mixed cement concrete may be employed.

In the following examples, several feed formulas in accord with the invention are set forth. These formulas are composed of several components to form a feed that may be used as a sole feed for the animal. These formulas are based on the known nutrient values of the ingredients of the feed mixture. The nutrient values of most of those ingredients which may be used within the borders of the invention are given in Table 3.

TABLE 3

| Feed | 1,000 Parts by Weight of Feed contain— | | | | | | |
|---|---|---|---|---|---|---|---|
| | Dry Matter | Crude ash | Organic Substance | Crude protein | Crude fat | Crude fiber | Nitrogen free extract substances |
| Barley | 860 | 25 | 835 | 103 | 19 | 46 | 667 |
| Rye | 903 | 81 | 822 | 129 | 32 | 254 | 407 |
| Oats | 882 | 29 | 853 | 112 | 49 | 104 | 588 |
| Corn | 870 | 15 | 855 | 96 | 43 | 22 | 694 |
| Tapioca meal | 874 | 27 | 847 | 16 | 4 | 32 | 795 |
| (8.0–12% crude fiber) wheat grit | 881 | 56 | 825 | 145 | 44 | 100 | 536 |
| Fishmeal (herring) | 906 | 131 | 775 | 673 | 100 | | 2 |
| Ground soy beans extracted | 865 | 59 | 806 | 454 | 8 | 57 | 287 |
| Dried skim milk | 937 | 80 | 857 | 360 | 7 | | 490 |
| Dried whey (sweet) | 940 | 104 | 836 | 119 | 1 | | 716 |
| Wheat after meal | 879 | 35 | 844 | 173 | 46 | 26 | 599 |
| Bean seed resp. bruised | 864 | 37 | 827 | 267 | 12 | 69 | 479 |
| Lentil seed bruised | 872 | 39 | 833 | 259 | 16 | 44 | 514 |
| Soy bean cake | 886 | 53 | 833 | 436 | 55 | 48 | 294 |
| Rolled oats | 886 | 20 | 866 | 127 | 71 | 27 | 641 |
| Lupine grain, yellow | 895 | 43 | 853 | 403 | 45 | 145 | 259 |
| Linseed oil meal expeller (30–90% fat) | 848 | 56 | 792 | 335 | 68 | 89 | 300 |
| Linseed oil meal extracted (solvent) | 911 | 60 | 851 | 358 | 16 | 96 | 381 |
| Dried yeast (from molasses) | 857 | 85 | 772 | 436 | 41 | 9 | 286 |

| Feed | Productive energy in percent | | | | 1,000 Parts by Weight of Feed contain— | | | |
|---|---|---|---|---|---|---|---|---|
| | Organic substance | Crude Protein | Crude fat | Crude fiber | Nitrogen free extract substances | Digestible protein | Starch units | Protein-starch units ratio |
| Barley | 82 | 73 | 80 | 15 | 90 | 75 | 689 | 9.2 |
| Rye | 79 | 63 | 72 | 77 | 84 | 81 | 511 | 6.3 |
| Oats | 75 | 83 | 91 | 31 | 79 | 93 | 645 | 7.0 |
| Corn | 88 | 67 | 81 | 70 | 92 | 64 | 780 | 12.1 |
| Tapioca meal | 98 | 75 | 60 | 55 | 99 | 12 | 813 | 67.8 |
| (8.0–12% crude fiber) wheat grit | 68 | 76 | 78 | 40 | 70 | 110 | 455 | 4.1 |
| Fishmeal (herring) | 85 | 90 | 100 | | | 606 | | |
| Ground soy beans extracted | 93 | 94 | 52 | 77 | 91 | 427 | 695 | 1.6 |
| Dried skim milk | 93 | 90 | 96 | | 95 | 324 | 672 | 2.1 |
| Dried whey (sweet) | 94 | 90 | 99 | | 95 | 107 | 620 | 5.8 |
| Wheat after meal | 86 | 77 | 84 | 30 | 91 | 133 | 760 | 5.7 |
| Bean seed resp. bruised | 84 | 83 | 84 | 50 | 93 | 222 | 688 | 3.1 |
| Lentil seed bruised | 88 | 86 | 41 | 72 | 91 | 223 | 715 | 3.2 |
| Soy bean cake | 89 | 91 | 89 | 54 | 93 | 397 | 766 | 1.9 |
| Rolled oats | 96 | 90 | 96 | 80 | 98 | 114 | 893 | 7.8 |
| Lupine grain, yellow | 87 | 90 | 88 | 81 | 83 | 363 | 719 | 2.0 |
| Linseed oil meal expeller (30–90% fat) | 77 | 82 | 88 | 40 | 97 | 275 | 658 | 2.4 |
| Linseed oil meal extracted (solvent) | 76 | 88 | 68 | 26 | 76 | 315 | 612 | 1.9 |
| Dried yeast (from molasses) | 84 | 81 | 77 | 42 | 88 | 353 | 654 | 1.9 |

Furthermore, in the immediately following examples the four growing periods of the hog are distinguished by its live weight. These stages are not quite in correspondence with those usual in the United States, where the weight stages are designated as prestarter, starter, growing and growing-finishing. However, the teaching in accordance with the invention may be applied with other classifications as well without substantial changes having to be made thereto.

In the following, some detailed explanations and examples of the invention will be given. The examples given are mainly restricted to hog feeding, however, corresponding relationships will result for hog breeding, beef production and cattle breeding. In order to adapt the protein content of the formula to the protein requirement of the animals, the composition of the formula is varied in the individual stages of the feeding. For instance, when feeding hogs, the crude protein content is about 18% at the beginning and only about 10% at the end.

The cereal does not constitute a formula by itself; it must be supplemented by substances rich in protein but, if possible, also by minerals, vitamins, antibiotics and trace elements. As a rule, so-called supplements are produced by the feed industry which also serve as carriers for all the remaining effective substances. These protein concentrates will then be mixed with ground cereals, in order to obtain a formula on a cereal basis which is fed as an only feed and fully satisfies the alimentary requirements of the animal.

For the following examples, a supplement designated Supplementan 63 and commercially sold is used which has the following composition:

| | Percent |
|---|---|
| Fish meal | 50.00 |
| Ground soy beans | 36.00 |
| Bone meal | 7.00 |
| Disodium phosphate | 4.50 |
| Aurofac 2A | 1.96 |
| Trace elements | 0.50 |
| Aderbe | 0.04 |
| | 100.00 |

The component Aurofac 2A is a commercially sold antibiotic. The designation Aderbe identifies a vitamin premix containing vitamins A, $D_3$ and $B_{12}$.

During the various feeding periods, the composition of the formula on the cereal basis is adapted to the respective protein requirement of the animal. In the embodiment shown, by way of example, four stages are defined namely:

(1) From 10 to 25 kilograms live weight, the animals receive a starter feed of the following composition by weight:

| | Percent |
|---|---|
| Corn, ground | 43.175 |
| Barley, ground | 15.000 |
| Oats, ground | 11.500 |
| Fish meal | 7.000 |
| Soy beans, ground (extracted) | 6.217 |
| Wheat bran with 0.33% Aderbe | 5.033 |
| Skim milk powder | 3.000 |
| Fat | 3.000 |
| Aurofac 2A | 2.800 |
| Dry feeding yeast | 2.000 |
| Lecithin | 0.750 |
| Pepsin | 0.500 |
| Trace elements | 0.025 |
| | 100.000 |

(2) From 25 to 40 kilograms live weight, the animals receive a feed formula for growing compositions by weight:

| | Percent |
|---|---|
| Corn, ground | 34 |
| Barley | 21.7 |
| Supplementan 63 | 18.3 |
| Rye, ground | 10.0 |
| Soy beans, ground (extracted) | 6.0 |
| Fat | 6.0 |
| Wheat bran | 4.0 |
| | 100.0 |

| | Percent |
|---|---|
| Corn | 36 |
| Barley | 35 |
| Supplementan 63 | 15 |
| Wheat bran | 8 |
| Tapioca meal | 6 |
| | 100 |

(3) From 40 to 75 kilograms live weight, the animals receive a formula for growing-finishing hogs of one of the following compositions by weight:

| | Percent |
|---|---|
| Corn | 33.5 |
| Rye | 20.0 |
| Supplementan 63 | 14.5 |
| Barley | 11.2 |
| Soy beans ground (extracted) | 9.3 |
| Fat | 6.0 |
| Wheat bran | 5.0 |
| Phosphate of lime for feeding purposes | 0.5 |
| | 100.0 |

| | Percent |
|---|---|
| Corn | 26.0 |
| Barley | 22.0 |
| Rye | 20.0 |
| Tapioca meal | 10.0 |
| Supplementan 63 | 10.0 |
| Wheat bran | 6.0 |
| Soy beans ground (extracted) | 5.5 |
| Phosphate of lime for feeding | 0.5 |
| | 100.0 |

(4) From 75 to 110 kilograms live weight, the animals receive a formula for finishing hogs of one of the following compositions by weight:

| | Percent |
|---|---|
| Corn | 29.0 |
| Rye | 25.0 |
| Barley | 13.1 |
| Soy beans ground (extracted) | 13.0 |
| Supplementan 63 | 8.4 |
| Fat | 6.0 |
| Wheat bran | 5.0 |
| Phosphate of lime for feeding purposes | 0.5 |
| | 100.0 |

| | Percent |
|---|---|
| Rye | 25.0 |
| Corn | 24.0 |
| Barley | 21.0 |
| Tapioca meal | 14.0 |
| Wheat bran | 5.0 |
| Soy beans, ground | 5.0 |
| Supplementan 63 | 5.0 |
| Phosphate of lime for feeding purposes | 1.0 |
| | 100.0 |

With the exception of the starter feed of paragraph (1) above two formulas are shown as examples for each stage. These examples differ mainly in the fat content. The compositions of this formula may be modified in many ways. In accordance with the invention, all these formulas are mixed in such a ratio that 100 parts of grain based formula having 10 parts of water are added to 100 parts up to 200 parts of water, and then subjected to a silaging process in this form, which means a lactic acid fermentation with the air being excluded. This pulp has therefore a water content of 55% to 75% by weight. In case that the water content of the grain based formula would be 15%, the slurry would have a water content of 57.5% to 72% by weight. Generally the water content of the pulp to be ensilaged may vary from 45% to 75% by weight.

The above recipes for the stages 1–4 may be prepared by the feed dealers or by the farmer himself. In some cases it may be desirable for the farmer to use a simpler method of preparation and/or to utilize greater amounts of his own cereals. For these and similar cases other recipes may be developed. If, for instance, a farmer wishes to purchase a formula and to simply mix it with an equal amount of his own cereals, the following formulas would serve this purpose in the various feeding stages:

(5) From 25 to 40 kilograms live weight, the animals receive a formula for growing pigs of one of the following compositions by weight:

| | Percent |
|---|---|
| Supplementan 64 | 36.6 |
| Corn, ground | 33.4 |
| Soy beans, ground (extracted) | 12.0 |
| Fat | 10.0 |
| Wheat bran | 8.0 |
| | 100.0 |

| | Percent |
|---|---|
| Corn | 42 |
| Supplementan 63 | 30 |
| Wheat bran | 15 |
| Tapioca meal | 12 |
| | 100 |

(6) From 40 to 75 kilograms of live weight, the animals receive a formula for growing-finishing hogs of one of the following compositions by weight:

| | Percent |
|---|---|
| Corn | 31.4 |
| Supplementan 63 | 29.0 |
| Soy beans, ground | 18.6 |
| Fat | 10.0 |
| Wheat grit | 10.0 |
| Phosphate of lime for feeding purposes | 1.0 |
| | 100.0 |

| | Percent |
|---|---|
| Corn | 36.0 |
| Tapioca meal | 20.0 |
| Supplementan 63 | 20.0 |
| Wheat bran | 12.0 |
| Soy beans, ground | 11.0 |
| Phosphate of lime for feeding purposes | 1.0 |
| | 100.0 |

(7) From 75 to 110 kilograms of live weight, the animals receive a formula for finishing hogs of one of the following compositions by weight:

| | Percent |
|---|---|
| Corn | 36.2 |
| Soy beans, ground (extracted) | 26.0 |
| Supplementan 63 | 16.8 |
| Fat | 10.0 |
| Wheat grit | 10.0 |
| Phosphate of lime for feeding purposes | 1.0 |
| | 100.0 |

| | Percent |
|---|---|
| Corn | 40.0 |
| Tapioca meal | 28.0 |
| Wheat grit | 10.0 |
| Soy beans, ground | 10.0 |
| Supplementan 63 | 10.0 |
| Phosphate of lime for feeding purposes | 2.0 |
| | 100.0 |

The grain based formula, thus is composed in the various feeding stages of 50% of the above indicated examples and 50% of grain grown on own fields. All the grain components will be ground. Cereals grown on the farmers own fields include barley, rye, corn and oats. The examples given above have been calculated on the basis of the known nutrient values of the individual components of the grain based formula. In the attached Table 3, the nutrient values for the individual main components are shown. The ensiling, during which lactic acid fermentation will occur in the known manner with air being precluded, and with no juice being extracted during the ensiling process.

Surprisingly, it was found that the albumen was but very little decomposed during the fermentation. Moreover, it is processed by ensiling so that the productive energy of the finish-ensilaged feed is increased in comparison with the non-fermented feed. This result is astonishing in so far as it was previously believed that green fodder rich in albumen, for instance grass, could be fermented only with utmost care. This astonishing result is perhaps due to the fact, that, although the protein in itself effects a buffering of the pH value and thus retards the lactic acid fermentation, the starch and sugar components of the grain based formula are, on the other hand, of such a considerable extent that the lactic acid fermentation occurs very quickly and very intensely. At any rate, it has been found that the fermentation may be carried out with a high degree of safety and spoilage need not be feared. The advantages of the process are, on the one hand, to be seen in the provision of a high-grade and well-digestible formula and on the other hand from the fact that the weighing of the individual components of the feed and the intimate mixing of the components with one another need take place only once before charging the silo container. The fermentation will be finished after 4–6 weeks. From this moment on, the farmer may feed the formula without any further metering and mixing operations in that he only needs to adjust the total amount to be fed.

Fish meal has been mentioned only as being typical for an animal protein feed. Shrimps, meat meal, bone meal, gluten feed-meal, greaves, fat and meat cakes, whale meat and meal of ground animal bodies, dry-milk products and thickened juice from pressed fishes, may also serve this purpose. The extracted soy bean meal is only typical for an extracted oilseed. Other oil cakes or extracted ground products may be used instead, for instance, extracted sesame seeds, peanuts, sunflower and cotton seeds, linseed, palm-kernels, copra and corn germs.

The following feed formula examples are given as typical embodiments of the invention for use in the production of feed and veal.

An example for the composition of a feed for beef production by weight:

| | Percent |
|---|---|
| Oil cake | 30 |
| Cereal milling by-products, for instance wheat bran | 30 |
| Ground cereals (corn, barley, etc.) | 30 |
| Ground leguminous seed or feed-meals of leguminous seed | 8 |
| Feed-lime | 2 |
| | 100 |

As regards the feeds for calves, the following formulas are given by weight:

(1)

| | Percent |
|---|---|
| Linseed meal or extracted coarse-ground grain (linseed) | 30 |
| Coarse-ground grain (barley, corn) | 20 |
| Oil cake or extracted coarse-ground oil seed (e.g. extracted coarse-ground soy beans) | 15 |
| Oatmeal | 10 |
| Dried skim milk | 10 |
| Sweet whey powder | 5 |
| Cereal milling by-products (e.g. wheat bran) | 5 |
| Dried yeast | 3 |
| Mixtures of mineral substances with vitamins and antibiotics | 2 |
| | 100 |

(2)

| | Percent |
|---|---|
| Linseed meal | 20 |
| Oats | 20 |
| Coarse-ground grains (barley, corn) | 20 |
| Oil cakes or extracted coarse-ground oil seed | 15 |
| Cereal milling by-products (wheat bran) | 13 |
| Sweet whey powder | 10 |
| Mixtures of mineral substances (with vitamins and antibiotics) | 2 |
| | 100 |

In this connection, the contents of antibiotics, especially Aureomycin is to be 5–10 mg. per kilogram. The feeds are intended for the growing period between milk or curdled milk feed for the calves until the beginning of beef production feed (age of the animals about 6 to 12 weeks). The designation Aureomycin is the generally accepted term under which the antibiotic chlortetracycline is commercially available.

When carrying out the invention on a farm the farmer will need a water-tight mixer. If, for instance, the mixing ratio of mixed cereal feed to water is to be 100:100, the farmer will charge 100 kilograms or more of cereal based formula and 100 kilograms or more of water into the mixer in dependence upon the capacity of the mixer. After both components have been intimately mixed with each other, the feed pulp is pumped into the ensiling container, for instance, by means of a pump, wherein the fermentation process will take place. Examples for these cereal based formulas which are given under feeding stages previously mentioned and numbered (1) to (4). Of course, the farmer will also be in a position to buy the components of these formulas singly and mix them on his own farm. For this purpose, he will need a suitable mixing plant.

What I claim is:

1. A method for the production of an improved animal feed comprising the steps of preparing a relatively dry mixture having a water content of about 15% by weight by mixing comminuted dry cereal grain with at least 8% by weight dry comminuted high protein feed ingredient, said ingredient having a digestible protein content of at least 20% by weight to give said mixture a selected carbohydrate to protein ratio sufficient to provide the entire protein requirements of the animal to be fed, adding to 100 parts by weight of said relatively dry mixture approximately 54.5 to 240 parts by weight water, thoroughly mixing said water and said relatively dry mixture until a pulp having a water content of 45 to 75% by weight has been formed, and ensiling said pulp under substantially air-free conditions for at least four weeks.

2. A method for the production of an improved animal feed comprising the steps of preparing a relatively dry mixture having a water content of about 15% by weight by mixing comminuted dry cereal grain with at least 8% by weight dry comminuted high protein feed ingredient, said ingredient having a digestible protein content of at least 20% by weight to give said mixture a selected carbohydrate to protein ratio sufficient to provide the entire protein requirements of the animal to be fed, adding to 100 parts by weight of said relatively dry mixture approximately 90 parts by weight water, thoroughly mixing said water and said relatively dry mixture until a pulp having a water content of approximately 55% by weight has been formed, and ensiling said pulp under substantially air-free conditions for at least four weeks.

3. A method for the production of an improved hog feed comprising the steps of preparing a relatively dry mixture having a water content of about 15% by weight, said mixture containing at least 60% by weight dry comminuted cereal grain and at least 8% by weight of a comminuted high protein feed ingredient, said ingredient being partly of vegetable and partly of animal origin and containing at least 20% by weight digestible protein, adding to 100 parts by weight of said relatively dry mixture about 89 parts by weight water, thoroughly mixing said water and said relatively dry mixture until a pulp having a water content of approximately 55% by weight has been formed, and ensiling said pulp under substantially air-free conditions for at least four weeks.

References Cited by the Examiner

UNITED STATES PATENTS

| | | | |
|---|---|---|---|
| 2,256,914 | 9/1941 | Whitcomb | 99—9 |
| 2,703,285 | 3/1955 | Luther | 99—2 |
| 2,885,289 | 5/1959 | Busch | 99—8 |
| 2,940,857 | 6/1960 | Andrews | 99—8 |
| 3,033,685 | 5/1962 | Hollenbeck et al. | 99—9 |

OTHER REFERENCES

Modern Silage Methods, Silver Mfg. Co., 1908, pp. 124, 143, 171.

A. LOUIS MONACELL, *Primary Examiner.*

D. DONOVAN, *Assistant Examiner.*